United States Patent
Hezel et al.

(10) Patent No.: US 7,870,807 B2
(45) Date of Patent: Jan. 18, 2011

(54) MULTI AXIS ROBOT WRIST AND METHOD OF OPERATION

(75) Inventors: Thomas Hezel, Asperg (DE); Bernd Leiensetter, Ilsfeld (DE); Frank Herre, Oberriexingen (DE); Bekim Maxharraj, Bietigheim-Bissingen (DE); Nedime Maxaharraj, legal representative, Bietigheim-Bissingen (DE)

(73) Assignee: Durr Systems Inc., Auburn Hills, MI (US)

( * ) Notice: Subject to any disclaimer, the term of this patent is extended or adjusted under 35 U.S.C. 154(b) by 698 days.

(21) Appl. No.: 11/527,230

(22) Filed: Sep. 26, 2006

(65) Prior Publication Data

US 2008/0011116 A1   Jan. 17, 2008

Related U.S. Application Data

(60) Provisional application No. 60/720,578, filed on Sep. 26, 2005.

(51) Int. Cl.
*B25J 17/00* (2006.01)
*B25J 17/02* (2006.01)
*B25J 18/00* (2006.01)
(52) U.S. Cl. ............. 74/490.06; 74/490.02; 901/29
(58) Field of Classification Search .......... 74/490.02, 74/490.04, 490.05, 490.06; 901/21, 28, 29, 901/43
See application file for complete search history.

(56) References Cited

U.S. PATENT DOCUMENTS

| | | | | |
|---|---|---|---|---|
| 4,703,668 A | * | 11/1987 | Peter | 74/490.06 |
| 4,708,580 A | * | 11/1987 | Akeel | 414/735 |
| 5,549,016 A | * | 8/1996 | Nakako et al. | 74/490.02 |
| 5,816,108 A | * | 10/1998 | Obata et al. | 74/490.05 |
| 5,848,556 A | * | 12/1998 | Ryu et al. | 74/490.02 |
| 6,014,909 A | * | 1/2000 | Fiora | 74/490.02 |
| 6,455,799 B1 | * | 9/2002 | Forslund et al. | 219/86.25 |
| 2002/0166403 A1 | * | 11/2002 | Choset et al. | 74/490.01 |
| 2004/0149064 A1 | * | 8/2004 | Narita et al. | 74/490.03 |
| 2004/0237154 A1 | * | 11/2004 | Hezel et al. | 901/29 |
| 2005/0129872 A1 | * | 6/2005 | van der Steur | 427/458 |

FOREIGN PATENT DOCUMENTS

| | | |
|---|---|---|
| DE | 38 02 533 | 8/1989 |
| DE | 39 29 139 | 3/1991 |
| DE | 100 33 986 | 1/2002 |
| DE | 696 17 825 T2 | 6/2002 |
| DE | 101 39 088 | 2/2003 |
| DE | 600 06 165 | 7/2004 |
| EP | 0 080 325 | 6/1983 |
| WO | WO 85/00168 | 4/1984 |

* cited by examiner

*Primary Examiner*—Thomas R Hannon
*Assistant Examiner*—Justin Krause
(74) *Attorney, Agent, or Firm*—Rader Fishman Grauer

(57) ABSTRACT

A robot wrist for a painting robot has several wrist sections that can be rotated relative to one another, an internal conduit that passes through the wrist sections, a flexible hose carried in the internal conduit and having a hose drive operating on the hose to achieve positive rotation of the hose in the internal conduit corresponding to the rotation of the wrist sections.

20 Claims, 4 Drawing Sheets

MULTI AXIS ROBOT WRIST AND METHOD OF OPERATION

CROSS-REFERENCE TO RELATED APPLICATIONS

This application claims the benefit of Provisional Patent Application Ser. No. 60/720,578 filed on Sep. 26, 2005.

FIELD OF THE INVENTION

The present invention relates in general to robots, and more particularly to a multi axis wrist for a painting robot and a method of operating the same.

BACKGROUND OF THE INVENTION

In modern paint facilities, multi-axis painting robots are used which carry application equipment, as for example a rotary atomizer, by means of a three-axis robot wrist. The hoses needed to operate the application equipment for paint, drive air, shaping air, and the like, are carried through an internal conduit in the robot wrist to the application equipment.

The disadvantage of routing the paint hose through the robot wrist is that the paint hose may become deformed when the robot wrist moves, which may preclude cleaning the paint hose inside the robot wrist using a device, such as a go-devil. To minimize paint losses during color changes it would be desirable if the paint hose can be cleaned along its entire length up to the application equipment using the go-devil, or similar device, including those portions of the hose located inside the highly mobile robot wrist.

SUMMARY OF THE INVENTION

The ability of the paint hose to be cleaned with a go-devil, or similar device, may be hampered by torsional loads which arise from movement of the robot wrist, wherein a clean bend in the paint hose is less disruptive and therefore does not preclude cleaning with the go-devil, or similar device. The present invention provides a robot wrist in which the hoses passing through the robot wrist are essentially loaded in flexion when the robot wrist moves, whereas only negligible torsion loads are imposed on the hoses. This is advantageous in that the ability to clean the hoses routed through the robot wrist using a go-devil, or similar device, will be only minimally, if at all, affected by movement of the robot wrist.

The robot wrist in accordance with the present invention may include three rotatable wrist sections. Application equipment can be installed rotatably on a connecting flange on the kinematic output side of the robot wrist. The robot wrist has three axes (i.e. three degrees) of freedom. It shall be understood, however, that the present invention is not limited to robot wrists having three axes of freedom, but may also include robot wrists with a greater or smaller number of rotational axes.

An internal conduit passing through the entire robot wrist is positioned within the wrist sections through which the hoses supplying the application equipment carried by the robot wrist are routed. The internal conduit can consist, for example, of a duct which is not sealed off with respect to the robot wrist for locating the hoses for operating the application equipment. When the wrist moves, however, there may be undesirable contact between the hoses and the inner wall of the robot wrist. Preferably, the internal conduit passing through the robot wrist has a protective sleeve which forms the inside lining of the internal conduit and thus prevents damage to, or excessive wear of, the hoses being carried through the robot wrist when the wrist moves. In addition, a protective sleeve of this type can consist of an electrically insulating material to insulate the electrically charged paint in the paint hose from the surrounding components. The protective sleeve preferably has an insulating capacity of at least 50 kV.

In accordance with the invention, the hoses for operating the application equipment do not run haphazardly inside the internal conduit. Instead, the robot wrist of the present invention has a hose drive which positively rotates the hose or hoses in the internal conduit in accordance with the rotation of the wrist sections to prevent, or at least minimize, imposing undesirable torsional loads on the hoses. With movement of the robot wrist and an associated rotation of the individual wrist sections relative to each other, the hose being guided is positively rotated on one side or on both sides by the hose drive to prevent, or at least minimize, the torsional load.

The hose drive allows rotation of the hose being carried through the robot wrist independent of the drive of the individual wrist sections. The hose drive can thus rotate the hose relative to one or more wrist sections.

The hose drive may also operate on the hose both at the kinematic input-side wrist section and at the kinematic output-side wrist section. Preferably, the hose drive rotates the hose passing through the internal conduit at the kinematic input-side wrist section and at the kinematic output-side wrist section independently of each other. Accordingly, it may be possible that the hose in the kinematic input-side wrist section is rotated more or less than in the kinematic output-side wrist section.

The hose drive may also act on the hose only at the kinematic input-side wrist section, while the hose in the kinematic output-side wrist section is secured to prevent rotation. This may be simpler from a construction standpoint because the hose drive does not need to operate through the entire robot wrist up to the kinematic output-side wrist section.

The rotation of the hose preferably takes place relative to the particular wrist section or to the internal conduit, with the rotation preferably taking place with respect to the center axis of the internal conduit. However, it is possible that the hose being carried through the robot wrist is rotated with respect to its own longitudinal axis.

The hose being carried through the robot wrist may be positioned by a guide plate in the kinematic input-side wrist section and/or in the kinematic output-side wrist section and/or in a wrist section located there between. The robot wrist of the present invention may include a guide plate for locating the hose or hoses preferably in both the kinematic input-side wrist section and in the kinematic output-side wrist section, whereas there is no guide plate in the wrist section located between those two sections. A guide plate of this type advantageously allows the hose or hoses being carried to be guided in the radial direction and in the peripheral direction relative to the longitudinal axes of the internal conduit, whereby the individual hoses are kept in position. In addition, carrying several hoses in one guide plate allows synchronous angular rotation of the hoses relative to the longitudinal axis of the internal conduit.

In instances where it may be desirable to have the hose secured to prevent rotation in the kinematic output-side wrist section, this can be achieved by mounting the guide plate securely in the kinematic output-side wrist section to prevent rotation.

In instances where it may be desirable to have a hose drive acting on both sides, the guide plate is preferably mounted rotatably in the kinematic input-side wrist section and in the kinematic output-side wrist section.

The hose drive preferably acts on the guide plate and preferably rotates it with respect to the longitudinal axis of the internal conduit.

It should be understood that the invention is not restricted to the previously described robot wrist as a single component, but may also include a complete robot, particularly a painting robot having a robot wrist of the type in accordance with the invention.

The present invention may also be used in connection with a painting robot.

Further areas of applicability of the present invention will become apparent from the detailed description provided hereinafter. It should be understood that the detailed description and specific examples, while indicating a preferred embodiment of the invention, are intended for purposes of illustration only and are not intended to limit the scope of the invention.

BRIEF DESCRIPTION OF THE DRAWINGS

The present invention will become more fully understood for the detailed description and accompanying drawings, wherein.

DETAILED DESCRIPTION OF THE PREFERRED EMBODIMENT

Figure 1:
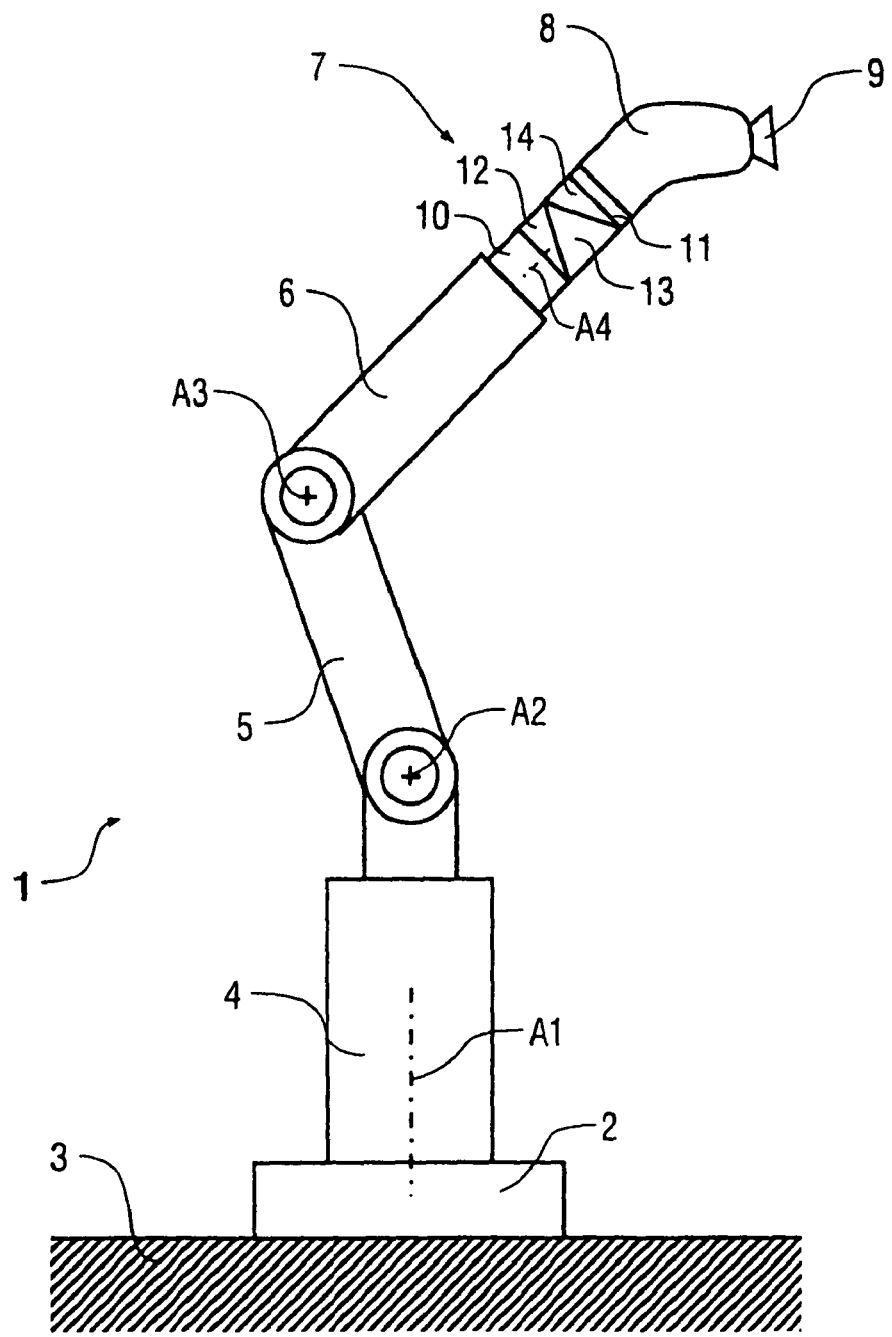
FIG. 1 is a side elevational view of a painting robot having a robot wrist in accordance with the present invention.

FIG. 1 shows a painting robot 1 in accordance with the invention, which can be used, for example, for painting automobile body parts.

The painting robot 1 is attached by a foot 2 to a base 3, where the foot 2 of the painting robot 1 carries a pedestal 4 which is rotatable relative to the foot 2 about a first axis A1. The drive for the pedestal 4 may be provided by an electric motor, or any other suitable drive device.

Painting robot 1 further includes a robot arm 5 that is rotatable about a second axis A2 relative to the pedestal 4, where the drive for the robot arm 5 may be similarly provided by an electric motor, or any other suitable drive device.

Painting robot 1 may also include a robot arm 6 that is rotatable about a third axis A3 relative to the robot arm 5, where the drive for the robot arm 6 is similarly provided by an electric motor.

A robot wrist 7, in accordance with the present invention, as illustrated in FIGS. 2A-2D, is attached to a distal end of robot arm 6.

The robot wrist 7 may carry a rotary atomizer 8 which drives a bell cup 9 for applying a coating medium to the automobile body parts.

The robot wrist 7 has a connecting flange 10 on the kinematic input-side that is rigidly and securely attached to prevent rotation relative to the distal end of robot arm 6.

On the side opposite the connecting flange 10, robot wrist 7 has a rotatable connecting flange 11, to which the rotary atomizer 8 is rotatably attached.

Three wrist sections 12-14 are located between the kinematic input-side connecting flange 10 and the kinematic output-side connecting flange 11, where the wrist sections 12-14 are rotatable relative to each other and with respect to the two connecting flanges 10, 11.

Wrist section 12 is rotatable about a fourth axis A4 relative to kinematic input-side connecting flange 10. Wrist section 13 located between wrist section 12 and wrist section 14 is rotatable about a fifth axis A5 relative to the wrist section 12. Wrist section 14 is further rotatable relative to the wrist section 13, but the rotation of wrist section 14 relative to wrist section 13 is positively coupled to the rotation of wrist section 12 relative to wrist section 13. Further, wrist section 14 is rotatable about a sixth axis A6 relative to the connecting flange 11.

Figure 2A:
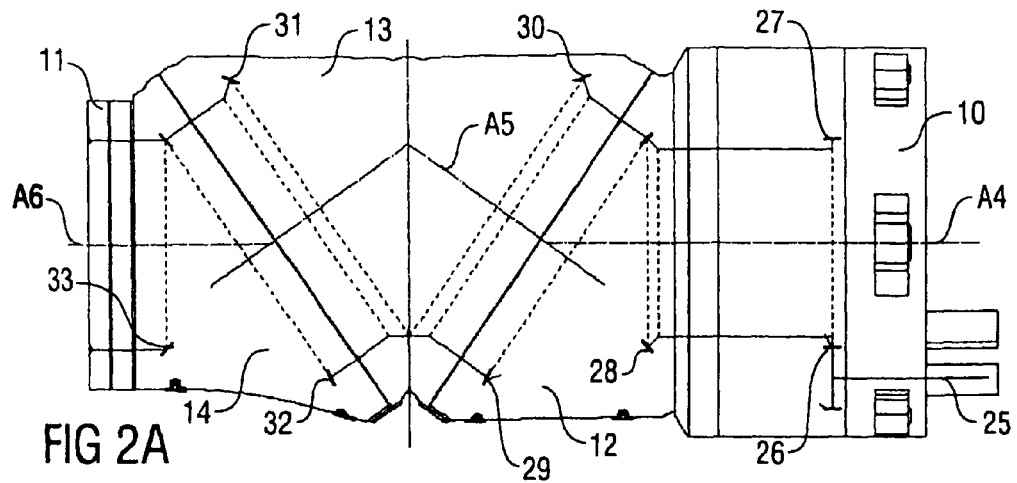
FIG. 2A is a side elevational view of the robot wrist showing a drive mechanism for operating an output section of the robot wrist.
Figure 2B:
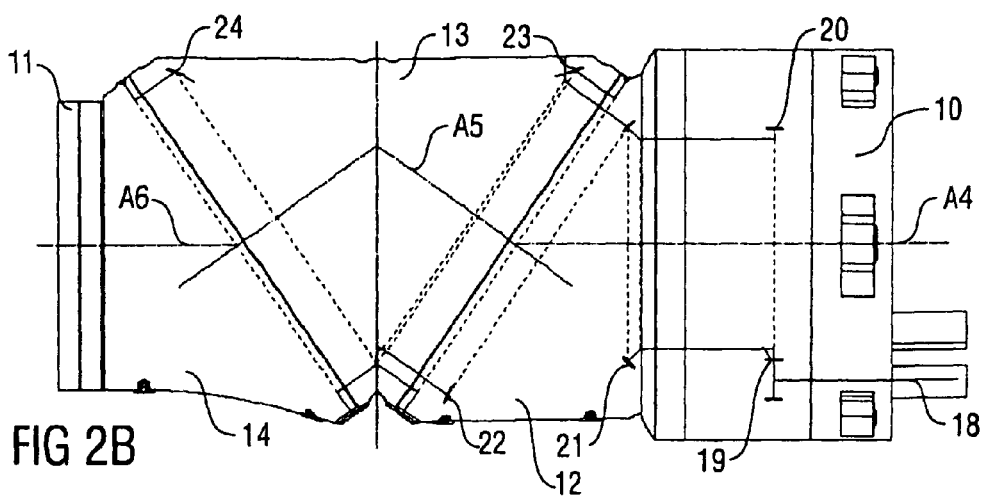
FIG. 2B is a side elevational view of the robot wrist showing a drive mechanism for operating an intermediate section of the robot wrist.
Figure 2C:
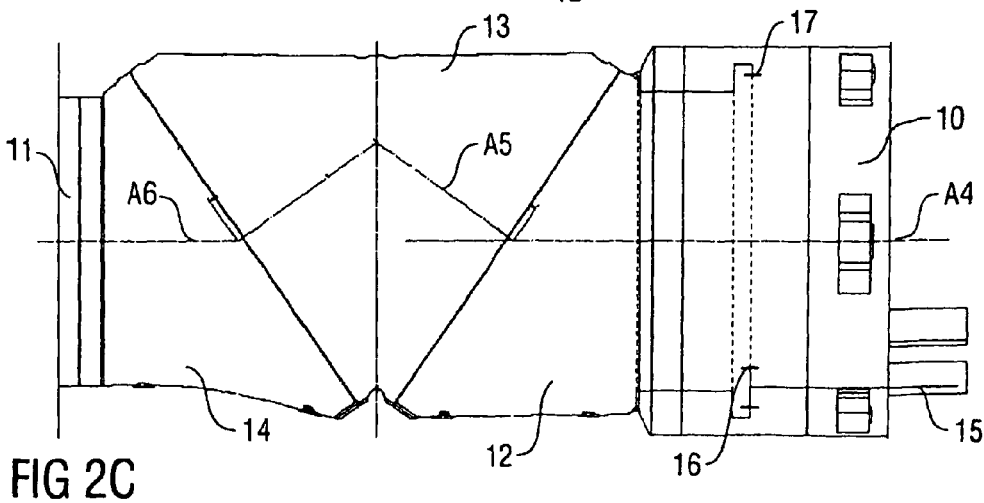
FIG. 2C is a side elevational view of the robot wrist showing a drive mechanism for operating an input section of the robot wrist.

The rotation of wrist section 12 about the fourth axis A4 relative to connecting flange 10 is described with reference to FIG. 2C, where, for the sake of clarity, only those components are shown which effect this rotation. Rotation is achieved by a drive shaft 15, depicted schematically, which drives a similarly schematically depicted external gear 16, wherein external gear 16 engages an annulus gear 17 which is connected non-rotatably to the wrist section 12. Rotation of the drive shaft 15 results in rotation of the external gear 16, where this rotation is transferred via the coupling between the external gear 16 and the annulus gear 17 to the wrist section 12.

The rotation of centrally located wrist section 13 about the fifth axis A5 relative to wrist section 12 is described with reference to FIG. 2B, where, for the sake of clarity, only those components are shown which are required for this rotation. For this rotation, robot wrist 7 has a drive shaft 18 which rotates an external gear 19, where the external gear 19 engages an external gear 20 and rotates same. External gear 20 has a helical gear 21 at its kinematic output end which engages a corresponding helical gear 22, wherein helical gear 22 is connected non-rotatably to wrist section 13 located between wrist sections 12 and 14. Rotation of drive shaft 18, via external gear 19, external gear 20, helical gear 21, and helical gear 22, results in rotation of wrist section 13 relative to the wrist section 12, wherein the rotation about axis A4 can be controlled independently of the rotation around axis A5.

Wrist section 13 carries an additional helical gear 23 that engages a helical gear 24, which is connected non-rotatably to wrist section 14, so that the rotation between wrist section 14 and wrist section 13 is positively coupled to the rotation between wrist section 13 and wrist section 12.

The rotation of drive flange 11 relative to wrist section 14 about axis A6 is described with reference to FIG. 2A. For this rotation, robot wrist 7 has an additional drive shaft 25 which carries an external gear 26, which in turn engages an external gear 27 and rotates same. At its kinematic output end, external gear 27 has a helical gear 28 that engages a corresponding helical gear 29 on wrist section 13. Wrist section 13 further includes a helical gear 30 that is non-rotatably coupled to helical gear 29. Helical gear 30 on wrist section 13 in turn engages a helical gear 31 on wrist section 14. Connecting flange 11 has a helical gear 33 which engages a helical gear 32. The rotation of drive shaft 25 is thus transferred via external gears 26, 27 and helical gears 28-33 to the connecting flange 11.

Figure 2D:
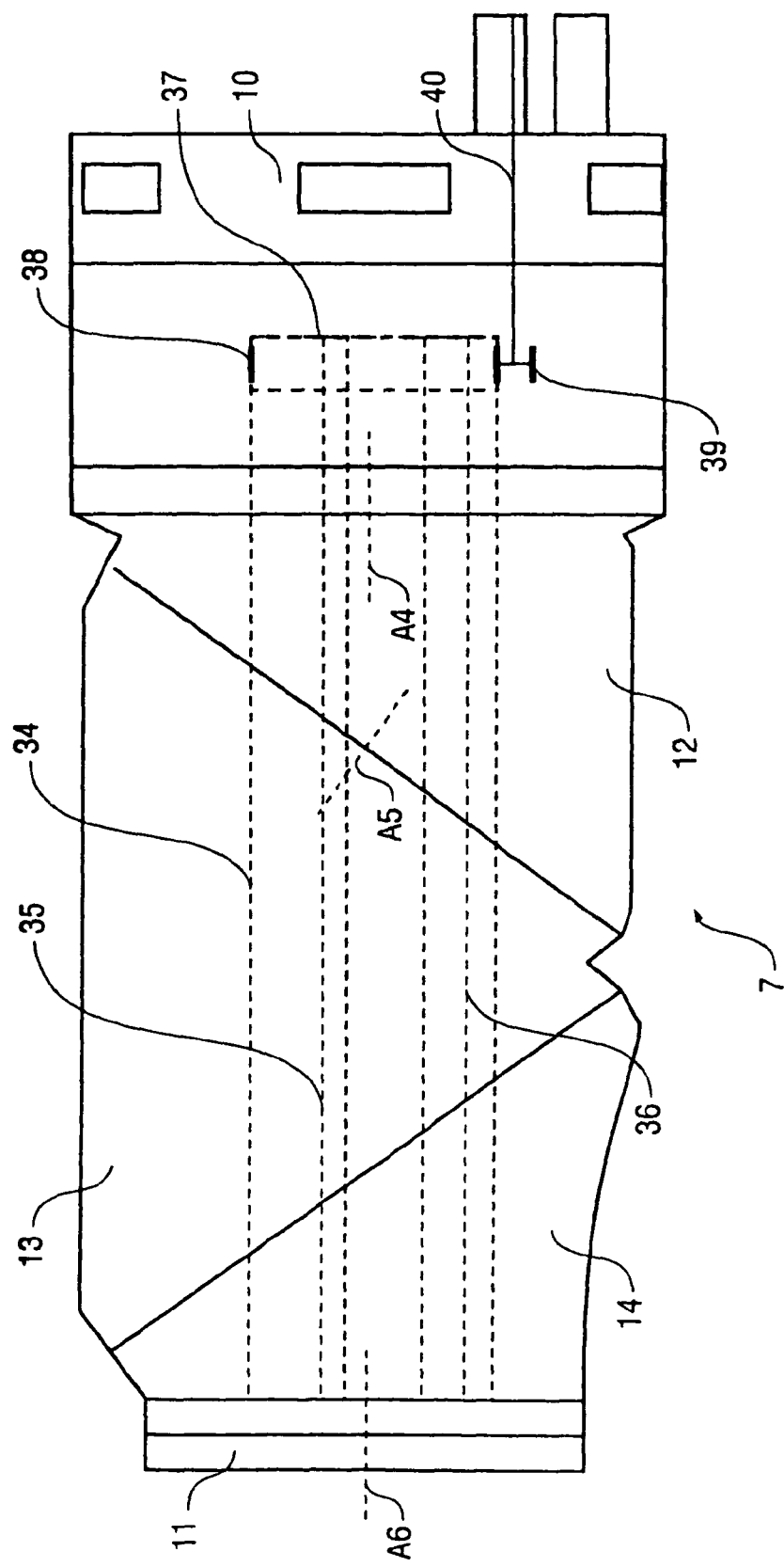
FIG. 2D is a side elevational view of the robot wrist showing the positioning of hoses within the robot wrist.

With reference also to FIG. 2D, robot wrist 7 has an internal conduit 34 that consists of a flexible protective sleeve with an electrical insulating capacity of 100 kV. The internal conduit 34 serves to carry several hoses 35, 36 for operating rotary atomizer 8.

Figure 3:
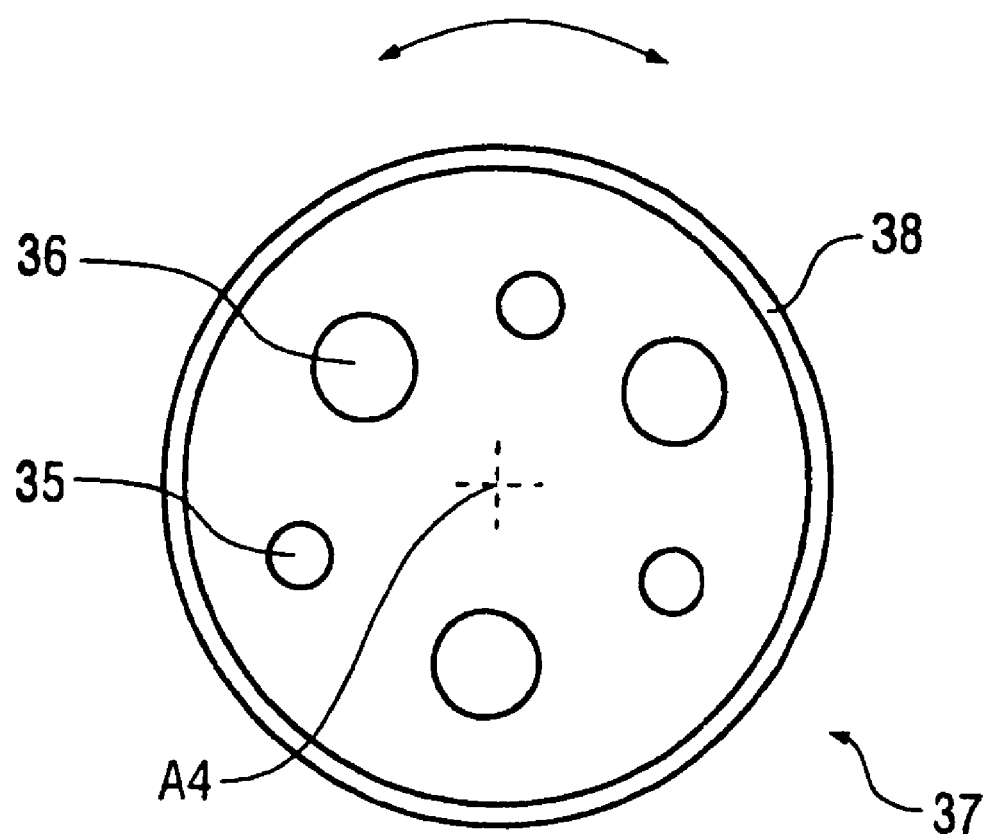
FIG. 3 is an axial front elevation of a guide plate of the robot wrist.

The hoses 35, 36 are connected non-rotatably to the kinematic output-side connecting flange 11, whereas hoses 35, 36 are carried in the kinematic input-side connecting flange 10 in a rotatably mounted guide plate 37, wherein guide plate 37 is also shown in FIG. 3.

Guide plate 37 has external teeth 38 on its circumferential surface, which engage the teeth of an external gear 39. External gear 39 can be rotated by a drive shaft 40. Guide plate 37 serves to dispose the hoses 35, 36 in the radial direction and in the circumferential direction inside the internal conduit 34. Guide plate 37 is rotatable via drive shaft 40, external gear 39, and external teeth 38, where rotation takes place such that the hoses 35, 36 are subject to minimal torsional loading when the robot wrist moves.

The detailed description of the invention is merely exemplary in nature and, thus, variations that do not depart from the gist of the invention are intended to be within the scope of the invention. Such variations are not to be regarded as a departure from the spirit and scope of the invention.

What is claimed is:

1. A robot wrist for use on a painting robot having several wrist sections including a kinematic input-side wrist section, a kinematic output-side wrist section, and at least one intermediate wrist section disposed between the kinematic input-side and kinematic output-side wrist sections, the wrist sections each independently rotatable relative to each other, an internal conduit which passes through the wrist sections, a flexible hose carried in the internal conduit the hose including a first portion rotated by the rotation of at least one of the wrist sections, and a guide plate disposed within the wrist, characterized in that a hose drive acts on the guide plate to positively rotate a second portion of the hose in the internal conduit corresponding to the rotation of the wrist sections, the second portion of the hose spaced away from the first portion of the hose.

2. The robot wrist in accordance with claim 1, wherein the hose drive acts on the hose only in the kinematic input-side wrist section, while the hose is secured to prevent rotation in the kinematic output-side wrist section.

3. The robot wrist in accordance with claim 1, wherein the hose is carried in at least one location selected from group consisting of the kinematic input-side wrist section, the kinematic output-side wrist section, and a guide plate.

4. The robot wrist in accordance with claim 3, wherein the guide plate is mounted rotatably in at least one location selected from a group consisting of the kinematic input-side wrist section, the kinematic output-side wrist section, and the intermediate wrist section located there between.

5. The robot wrist in accordance with claim 3, wherein the hose drive acts on the guide plate and rotates the guide plate to minimize torsional loading on the flexible hose when the robot wrist moves.

6. The robot wrist in accordance with claim 1, wherein the internal conduit has an electrical insulating capacity of at least 50 kV.

7. The robot wrist in accordance with claim 1, wherein the hose is a paint hose.

8. The robot wrist in accordance to claim 1 characterized in that a painting robot is connected to the robot wrist for movement.

9. The robot wrist of claim 1, wherein the hose is rotatable with respect to the intermediate wrist section via the hose drive.

10. The robot wrist of claim 1, wherein the guide plate is disposed within the kinematic input-side wrist section.

11. A method of operating a robot having a robot wrist with several wrist sections including a kinematic input-side wrist section, a kinematic output-side wrist section, and at least one intermediate wrist section disposed between the kinematic input-side and kinematic output-side wrist sections, the wrist sections each independently rotatable relative to each other, an internal conduit passing through the wrist sections, a flexible hose carried in the internal conduit, the hose including a first portion by the rotation of at least one of the wrist sections, and a guide plate disposed within the wrist, characterized in that rotation of a second portion of the hose and a second portion of the guide plate positively in the internal conduit depends on rotation of the wrist sections, the second portion of the hose spaced away from the first portion of the hose.

12. The method of operating a robot in accordance with claim 11, wherein the hose is rotated positively only in the kinematic input-side wrist section, while the hose is secured not to rotate in the kinematic output-side wrist section.

13. The method of operating a robot in accordance with claim 11, wherein the hose is carried in at least one section selected from a group consisting of the kinematic input-side wrist section, the kinematic output-side wrist section, and a guide plate in the intermediate wrist section.

14. The method of operating a robot in accordance with claim 11, wherein positively driving the hose rotation includes rotating a guide plate, the guide plate supporting the hose.

15. The method of claim 11, further comprising rotating the hose with respect to the intermediate wrist section via the hose drive.

16. A robot comprising: a wrist including a plurality of wrist sections including a kinematic input-side wrist section, a kinematic output-side wrist section, and at least one intermediate wrist section disposed between the kinematic input-side and kinematic output-side wrist sections, the wrist sections each independently rotatable relative to each other; an internal conduit passing through the plurality of wrist sections; a flexible hose carried in the internal conduit, the hose including a first portion rotated by the rotation of at least one of the wrist sections; a guide plate disposed within the wrist, and a hose drive acting on the guide plate to positively rotate a second portion of the hose in the internal conduit in response to rotation of the plurality of wrist sections, the second portion of the hose spaced away from the first portion of the hose.

17. The robot of claim 16, wherein the hose drive acts on the hose only in the kinematic input-side wrist section, while the hose is secured to prevent rotation in the kinematic output-side wrist section.

18. The robot of claim 16, wherein the hose is carried in at least one location selected from group consisting of the kinematic input-side wrist section, the kinematic output-side wrist section, a guide plate, and the intermediate wrist section.

19. The robot of claim 16, wherein a guide plate is positioned to rotate the flexible hose with respect to the intermediate wrist, the hose drive acting on the guide plate to rotate the guide plate, the hose drive acting on the hose in the kinematic input-side wrist section, while the hose is secured to prevent rotation in the kinematic output-side wrist section.

20. The robot of claim 16, further comprising:
   a robot arm secured to the kinematic input-side wrist section and spaced away from the guide plate longitudinally with respect to the arm; and
   a painting tool supported by the kinematic output-side wrist section.

\* \* \* \* \*